United States Patent [19]

Fleming

[11] 4,058,686
[45] Nov. 15, 1977

[54] TELEPHONE ATTACHMENT

[76] Inventor: John O. Fleming, 1144 N. Main St., Darlington, Wis. 53530

[21] Appl. No.: 619,942

[22] Filed: Oct. 6, 1975

[51] Int. Cl.² ............................................. H04M 1/23
[52] U.S. Cl. ............................. 179/90 AT; 179/1 HS
[58] Field of Search .......... 179/90 AD, 90 A, 90 AT, 179/161, 162, 1 HS

[56] References Cited

U.S. PATENT DOCUMENTS

| | | | |
|---|---|---|---|
| 1,859,622 | 5/1932 | Fitch | 179/90 AD |
| 2,595,054 | 4/1952 | Chesick | 179/161 |
| 2,830,129 | 4/1958 | Kahn | 179/90 AD |
| 2,835,745 | 5/1968 | Rumano | 179/161 |
| 2,999,902 | 9/1961 | Swartz | 179/90 AD |
| 3,156,771 | 11/1964 | Vaughn | 179/1 HS |
| 3,170,990 | 2/1965 | Beatty | 179/90 AD |
| 3,226,491 | 12/1965 | Spangler | 179/161 |
| 3,384,720 | 5/1968 | Beatty | 179/162 |

Primary Examiner—William C. Cooper
Assistant Examiner—Gerald L. Brigance
Attorney, Agent, or Firm—Andrus, Sceales, Starke & Sawall

[57] ABSTRACT

A dial-type telephone has a receiver which is removed from its cradle, and a pivotal arm is disposed in the cradle and positioned over the switch buttons. An elongated pivotal handle is disposed adjacent the arm and is provided with latch means for holding the arm down in engagement with the switch buttons so that the latter are in the "off" position. Movement of the handle by a body member releases the arm from the buttons so that the latter can rise to the "on" position. The rotary phone dial carries a pulley or drum having a cable attached to a slide disposed within an elongated tube. A handle on the slide extends outwardly through a slot in the tube and may be moved by a body member to actuate the dial mechanism.

3 Claims, 4 Drawing Figures

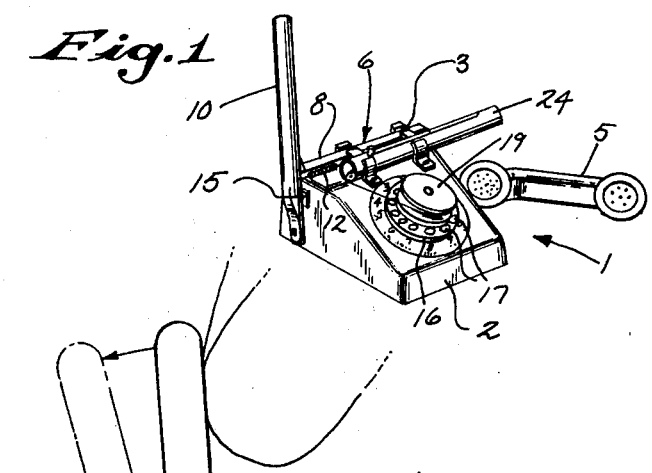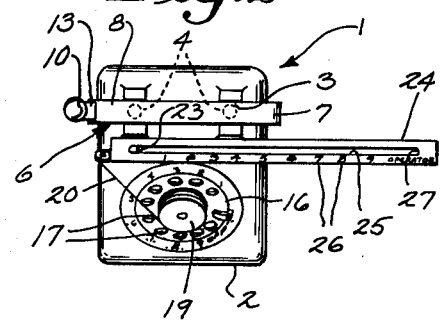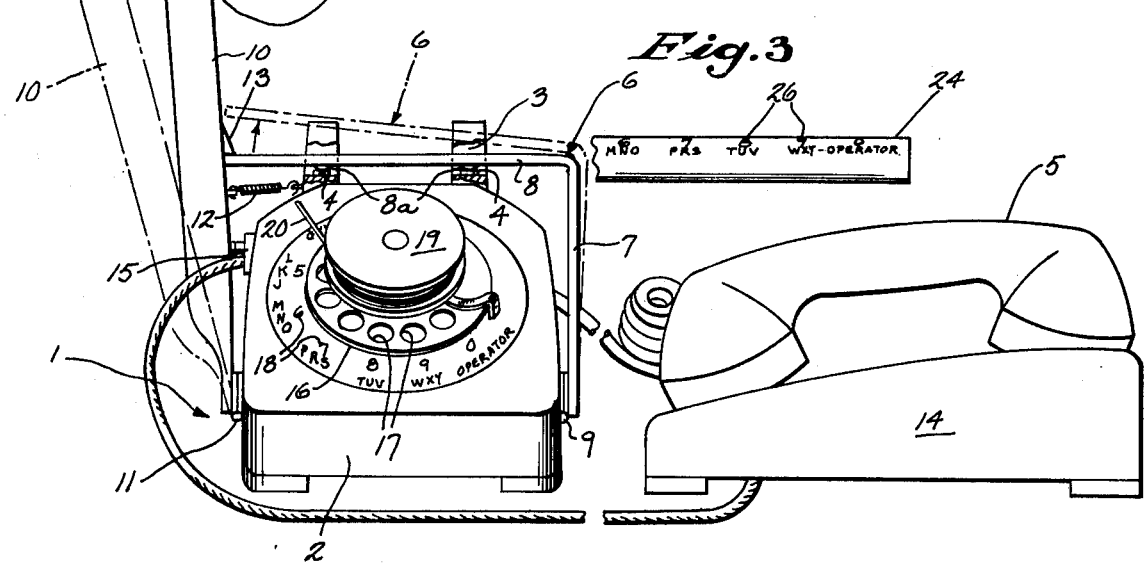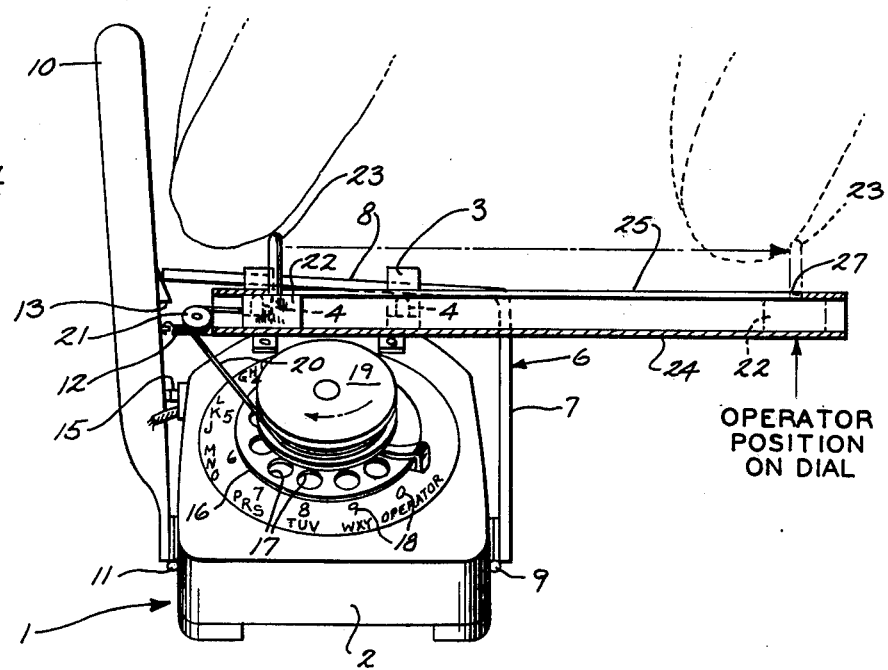

TELEPHONE ATTACHMENT

BACKGROUND AND SUMMARY OF THE INVENTION

This invention relates to a telephone attachment and more particularly to a device for attachment to a dial-type cradle phone to enable handicapped persons to activate and deactivate the switch mechanism as well as actuate the dialing mechanism.

The inherent design of present rotary-type dial phones requires the use of the hand to remove and replace the receiver from the cradle, as well as at least one finger to actuate the dial. Large numbers of handicapped people who have no fingers or hands, or do not have the normal use thereof, are therefore at a great disadvantage in operating a telephone. Emergencies may arise wherein the inability of a handicapped or disabled person to use the phone may be fatal.

The present invention is directed to a simple, yet effective device which permits actuation of the switch and dialing mechanisms by parts of the body such as the head, arm, foot or even shoulder.

More particularly, the invention contemplates that the phone receiver is removed from its cradle, and a pivotal arm is disposed in the cradle and positioned over the switch buttons. An elongated pivotal handle is disposed adjacent the arm and is provided with latch means for holding the arm down in engagement with the switch buttons so that the latter are in the "off" position. Movement of the handle by a body member releases the arm from the buttons so that the latter can rise to the "on" position. The rotary phone dial carries a pully or drum having a cable attached to a slide disposed within an elongated tube. A handle on the slide extends outwardly through a slot in the tube and may be moved by a body member to actuate the dial mechanism.

BRIEF DESCRIPTION OF THE DRAWINGS

The accompanying drawings illustrate the best mode presently contemplated by the inventor for carrying out the invention.

In the drawings:

FIG. 1 is a perspective view of a dial-type telephone having the dialing device of the invention attached thereto;

FIG. 2 is a top plan view of the phone base;

FIG. 3 is an enlarged front elevational view with parts broken away and showing the switch actuating means; and FIG. 4 is a view similar to FIG. 3 and showing the dial actuating means.

DESCRIPTION OF THE PREFERRED EMBODIMENT

As shown in the drawings, the device of the invention is contemplated for use with a dial-type telephone 1 having a base 2 with the usual cradle 3 and outwardly biased switch buttons 4; as well as a receiver 5.

Under normal circumstances, receiver 5 would be held in cradle 3 to deactivate the phone, and would be manually removed from the cradle during phone use. In the present instance, however, and in view of use of the phone by handicapped persons, receiver 5 is permanently removed from base 2 and may lie adjacent thereto, as shown in FIG. 1.

The device of the invention includes means operable by other than a person's hands to selectively activate and de-activate the phone. For this purpose, a generally L-shaped arm 6 is provided and with the arm having an elongated downwardly extending leg 7 and an elongated horizontal leg 8. Arm 6 is preferably constructed of relatively light weight spring-like material, and legs 7 and 8 may be joined at an angle of slightly more than 90°. The lower end of leg 7 is shown as pivotally mounted to phone base 2, as by a hinge 9, while the opposite end of the arm is free.

Leg 8 is constructed to overlie cradle 3 above switch buttons 4, and to be releasably locked in an inward position to hold the buttons down so that the phone is de-activated. The leg may have projections 8a for engaging the buttons. An enlarged vertically extending elongated handle 10 is disposed adjacent and transversely of the free end of arm 6. The lower end of handle 10 is pivotally mounted to base 2, as by a hinge 11. A spring 12 extends between base 2 and handle 10 to bias the latter toward and into engagement with the free end of arm 6. A latch 13 is disposed on handle 10 and projects inwardly toward the arm. Latch 13 is positioned so that when leg 8 is in its lowermost "phone off" position, it will be held in place by the latch.

As best shown in FIG. 3, a handicapped person may use an elbow or other member to pivot handle 10 outwardly, thus causing leg 8 to be disengaged from latch 13 and to spring upwardly. Arm 6 will also tend to pivot about hinge 9. The described action will permit switch buttons 4 to rise and activate the phone to provide line connection for answering or dialing. When a person wishes to de-activate the phone, he pushes downwardly on leg 8 so that its end slides along the spring biased handle 10 until it snaps beneath latch 13.

In some instances, and to eliminate the need for the phone user to be closely adjacent the receiver, the latter may be placed on a telephone amplifying device 14 of any suitable wellknown type. See FIG. 3. Device 14 is shown as actuated by a switch 15 mounted on a base 2 and engageable by handle 10. Switch 15 is responsive to outward pivoting of the handle to thereby activate the amplifier.

The device of the invention further includes means operable by other than a person's hands to selectively actuate the telephone dial, which comprises the usual rotary member 16 having openings 17 therein which coincide or register with the usual indicia numbers 18 on phone base 2. As shown, a pulley or drum 19 is mounted on the face of dial 16 for rotation therewith. A cable 20 is wound around drum 19 and extends rearwardly and around a pulley 21 to a slide member 22 having an upwardly extending handle 23 thereon. Member 22 is adapted to be moved along a linear path by an elbow or the like to extend cable 20 and thereby cause dial 16 to rotate, as shown in FIG. 4. For this purpose, slide member 22 is mounted for movement in an elongated channel means, such as a tube 24, the latter being mounted on phone base 2. A longitudinal slot 25 is disposed in the tube wall so that handle 23 projects outwardly therethrough and traverses the slot during dialing.

If desired, a series of linearly spaced indicia numbers 26 may be positioned on tube 24, preferably along slot 25, and which correspond with numbers 18 in sequence and placement. Thus, with a phone dial having numerals 1-9 and a 0 thereafter, counterclockwise, the same sequence would appear on tube 24 from left to right, as if the circular dial had been laid out straight.

When the dial is used, the person moves handle 23 rightwardly until it coincides with the desired number 26, causing dial 16 to turn the same distance as if a finger had been used in the dial opening 17 for the same number.

By placing the numeral 0 (operator) at the maximum reach of movement of slide member 22, in an emergency a handicapped person can merely shove handle 23 to the right as far as it will go to reach the operator. The normal return action of dial 16 will move the handle back to its starting position.

When dialing the numeral 0, it will be unnecessary to look at the indicia if a stop means is provided to limit slide movement so that it does not extend beyond that numeral. As shown, the stop may comprise the outer end or terminus 27 of slot 25. Alternately, it may comprise a separate stop member or a limited length of cable.

The concept of the invention provides a unique device for assisting handicapped and disabled persons in using the telephone without hands. While other members may be used to operate the device, it is also contemplated that yardsticks, books and the like which can be somehow manipulated by the user would also serve to actuate the mechanism.

Various modes of carrying out the invention are contemplated as being within the scope of the following claims particularly pointing out and distinctly claiming the subject matter which is regarded as the invention.

I claim:

1. In combination with a telephone having a base, a rotatable dial on the base, a cradle associated with the base and from which the telephone receiver has been removed, and an actuating switch button disposed in the cradle, an attachment to be used by a handicapped person to operate the telephone, comprising an arm mounted on the telephone and movable between an operative position wherein the arm overlies the cradle and depresses the switch button and an inoperative position wherein the arm is out of engagement with the switch button, a handle pivoted to the base and projecting upwardly beyond the base to a position where it can be engaged by other than a person's hand, latch means carried by the handle for latching the arm in the operative position, pivotal movement of said handle acting to release said latch means and move said arm to the inoperative position and release said switch button, a drum mounted on the dial, a cable wound around the drum, an elongated tube connected to the base and having a longitudinal slot extending a substantial portion of the length thereof, a slide disposed within the tube for sliding movement therein, said slide being connected to the outer end of said cable, a projection mounted on the slide and extending outwardly through said slot, the outer extremity of said slot forming a stop to limit the sliding movement of said projection in said slot, and linearly spaced indicia on said tube for determining the rotary position of said dial relative to the position of said projection, said projection adapted to be engaged by other than a handicapped person's hand and moved longitudinally of said slot to thereby rotate said dial and enable the person to place a telephone call.

2. The device of claim 1 which includes means to bias said handle toward engagement with said arm.

3. The device of claim 1 which is for use with a telephone having a receiver mounted on an amplifying apparatus, said device including:
   a. switch means for connection to the amplifying apparatus,
   b. said switch means being responsive to outward pivoting of said first-named handle to activate said amplifying apparatus.

* * * * *